US006829468B2

United States Patent
Gandhi et al.

(10) Patent No.: US 6,829,468 B2
(45) Date of Patent: Dec. 7, 2004

(54) REVERSE-LINK POWER CONTROL OVERSHOOT CONSIDERING MOBILE STATION TRANSMISSION LIMITATIONS

(75) Inventors: Asif Dawoodi Gandhi, Summit, NJ (US); Marc Benedict Ibanez, San Lorenzo, CA (US); Lei Song, Edison, NJ (US); Mathew Thomas, Madison, NJ (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 60 days.

(21) Appl. No.: 09/797,708

(22) Filed: Mar. 5, 2001

(65) Prior Publication Data

US 2003/0022630 A1 Jan. 30, 2003

(51) Int. Cl.[7] ............................. H04B 1/00; H04B 7/00
(52) U.S. Cl. ................... 455/69; 455/63.1; 455/67.11; 455/13.4; 455/522; 455/574; 370/335; 370/318; 370/252
(58) Field of Search ......................... 455/69, 522, 574, 455/63.1, 524, 67.11, 13.4; 370/335, 252, 318

(56) References Cited

U.S. PATENT DOCUMENTS

| 5,881,368 A | * | 3/1999 | Grob et al. .................... 455/69 |
| 5,926,747 A | * | 7/1999 | Komara et al. ............... 455/69 |
| 6,101,179 A | * | 8/2000 | Soliman ...................... 370/342 |
| 6,169,907 B1 |   | 1/2001 | Chang et al. |
| 6,173,162 B1 | * | 1/2001 | Dahlman et al. .............. 455/69 |
| 6,334,047 B1 | * | 12/2001 | Andersson et al. ........... 455/69 |
| 6,445,930 B1 | * | 9/2002 | Bartelme et al. ........... 455/522 |
| 6,609,008 B1 | * | 8/2003 | Whang et al. .............. 455/522 |
| 6,650,691 B2 | * | 11/2003 | Cramer, III ................. 375/146 |

FOREIGN PATENT DOCUMENTS

| EP | 0 926 842 A2 | 6/1999 |
| WO | WO 02/15431 A2 | 2/2002 |

* cited by examiner

Primary Examiner—Marceau Milord

(57) ABSTRACT

In a method for minimizing reverse link power control overshoot in a wireless communications system, the output power of a mobile station is detected to determine whether it falls outside a dynamic range of the mobile station. If outside the dynamic range, a new output power falling within the dynamic range is calculated and set, and the mobile station is instructed to transmit at the new output power.

22 Claims, 3 Drawing Sheets

REVERSE-LINK POWER CONTROL OVERSHOOT CONSIDERING MOBILE STATION TRANSMISSION LIMITATIONS

FIELD OF THE INVENTION

The present invention relates to telecommunications in general, and more particularly, to a method for controlling reverse-link power control overshoot in a wireless communications system.

BACKGROUND OF THE INVENTION

FIG. 1 depicts a schematic diagram of a portion of a conventional wireless communications system. As shown, the wireless communications system 1 includes a mobile switching center (MSC) 5, operatively connected with a plurality of base stations (BS) 10, for performing call connection control and mobility management. The base stations 10 include equipment to communicate with the MSC 5, and with various mobile stations (MS) 20. Each base station 10 transmits a pilot signal of constant power on the same frequency. The power level of the received pilot signal enables the mobile station 20 to estimate the path loss between the base station 10 and the mobile station 20. Knowing the path loss, the mobile station 20 adjusts its output transmit power such that the base station 10 will receive signals at the requisite power level. The base station 10 measures the output power of the mobile station 20 and informs the mobile station 20 to make any necessary adjustments to its transmit power. Mobile stations (MS) 20, operatively connected with the base stations 10, have equipment for allowing communication with the base stations 10, and for establishing forward links (base station to mobile station) and reverse links (mobile station to base station) therebetween.

CDMA is one scheme for defining forward and reverse link channels between base stations and mobile stations of a wireless communications system, such as a cellular telephone system. CDMA is an interference-limited system, whereby all mobile stations transmit at the same frequency, and the internal interference generated within the system plays a critical role in determining system capacity and voice quality. The CDMA system uses power control and voice activation to minimize mutual interference. Precise power control and voice activation avoids excessive transmitter power, which contributes to overall interference in the system. As the mobile station moves around, the wireless communications environment changes continuously due to fast and slow fading, shadowing, external interference, and other factors. One feature of a CDMA system is to transmit just enough power to meet the required performance objectives. The objective of power control is to limit the transmitted power on the forward and reverse links while maintaining link quality under all conditions. The transmit power from each mobile station must be controlled to limit interference therebetween. At the same time, the power level should be adequate for satisfactory voice quality. Otherwise, if more power is transmitted than necessary, one mobile station interferes with the operation of other mobile stations, and capacity is reduced.

In a CDMA system, all mobile stations 20 should achieve the same received power levels at the base station 10 to minimize interference within the wireless communications system 1 while achieving the required performance objectives. Reverse link power control affects the access and reverse traffic channels. Reverse link power control includes open-loop power control (also known as autonomous power control) and closed-loop power control.

Open-loop power control is based on the principle that a mobile station 20 closer to the base station 10 needs to transmit less power as compared to a mobile station 20 that is farther away from the base station 10 or is in fade. The mobile station 20 adjusts its transmit power based on total power received, including power received from all base stations 10 on the forward link channels. If the power received is high, the mobile station 20 reduces its transmit power, and vice versa. Dynamic or moving mobile stations (i.e., fading sources) in multipath require much faster power control than the open-loop power control can achieve.

Closed-loop power control provides additional power adjustments required to compensate for fading losses (e.g., when the signal interference between the mobile station and the base station increases). Closed-loop power control also provides correction to the open-loop power control. Once a traffic channel is established, the mobile station 20 and base station 10 engage in closed-loop power control. The quicker response time gives the closed-loop power control mechanism the ability to override the open-loop power control mechanism in practical applications.

FIG. 2 depicts a conventional method of reverse link closed-loop power control that is performed between the mobile station 20 and base station 10 to ensure that a proper communications link can be established therebetween. In step 100, the mobile station 20 transmits to the base station 10 at a certain output power in accordance with a request from the base station 10. In step 200, the base station 10 detects and measures the output power of the mobile station 20.

Next, in step 300, the base station 10 determines whether the output power of the mobile station 20 needs adjustment. This is done by comparing output power level requested by the base station 10 with the actual output power received from the mobile station 10, and considering the amount of signal interference in the current communications environment. If the mobile station's output power does not require adjustment, the reverse-link power control process proceeds to step 600 to establish a communications link between the mobile station 20 and the base station 10 using well known techniques in the conventional art. In contrast, if the mobile station's output power requires adjustment, the mobile station 20 calculates a new output power as shown in step 400.

Step 400 will be described in more detail with respect to the IS-95 CDMA standard. Under the current IS-95 CDMA standard, the transmit power of a mobile station 20 should be tightly controlled by the base station 10 through closed-loop power control. The base station 10 informs the mobile station 20, by sending a power control bit, to make any necessary adjustments (i.e., increase or decrease) to the mobile station transmit power. This is commonly referred to as the closed-loop power control correction. As known in the art, the mean output power of the mobile station 20 is calculated by the mobile station 20 using the following algorithm:

$$\begin{aligned}\text{Output power} = &-\text{mean input power} + \text{offset} + \\ &\text{interference correction from the last access probe} + \\ &(NOM\_PWR - 16*NOM\_PWR\_EXT) + INIT\_PWR + \\ &\text{the sum of all access probe corrections} + \\ &\text{the sum of all closed loop power control corrections.}\end{aligned} \quad (1)$$

In the above Equation (1), all terms are well known in the conventional art. To obtain the mobile station's output power, a negative value of the mobile station's mean input power is added with a predetermined offset value and the interference correction from the last access probe. Here, an access probe refers to a transmission during an access attempt performed between the mobile station 20 and the base station 10 to establish a communications link therebetween. Access probes are continuously performed at incremental power levels. This is referred to as performing access probe corrections. The next added term of equation (1) comprises a nominal power for handoff (NOM_PWR) multiplied with a nominal power for extended handoff (NOM_PWR_EXT). An initial power adjustment (INIT_PWR) is added thereafter. Then, the sum of all access probe corrections performed in establishing a communications links is added to the above-identified terms. Finally, the sum of all closed loop power control corrections is added.

Upon calculation of the mobile station's output power, the mobile station 20 transmits to the base station 10 at the newly calculated output power, as shown in step 500. Steps 200 through 500 are repeated thereafter, as required, whereby closed-loop power corrections are continuously performed to establish and maintain proper communication between the mobile station 20 and the base station 10, as shown in step 600.

However, in the conventional art, there is a potential for power control "overshoot" (e.g., exceeding the maximum or minimum limit) of the mobile station's transmit power in the reverse link in the conventional open-loop power control. The base station 10 may unnecessarily continue to inform the mobile station 20 to make adjustments to the mobile station's transmit power, even when the mobile station transmit power limit has already been reached.

More specifically, due to open-loop correction and the maximum power constraint, the last term, i.e., the sum of all closed loop power control corrections, may be accumulated even when the mobile station transmit power has reached a maximum. Likewise, due to open-loop correction and the minimum power constraint, the last term, i.e., the sum of all closed-loop power control corrections, may be accumulated even when the mobile station transmit power has dropped down to a minimum. If the communications environment changes such that there is more or less signal interference between the mobile station 20 and the base station 10, the closed-loop power control will first need to cancel the previously accumulated power control correction values before it begins to have effect on the mobile station 20 to transmit at the appropriate transmit power.

For example, if the mobile station transmit power is already at its upper limit, and the communications environment changes such that there is increased signal interference between the mobile station and the base station, the base station 10 informs the mobile station 20 to further increase its transmission power. Thereafter, the mobile station 20 determines according to equation (1) a transmit power level greater than the mobile station's maximum possible transmit power level; and therefore transmits at the maximum power level. If the communications environment changes again such that the mobile station 20 should transmit at less than the maximum power limit, the mobile station 20 will continue to transmit at the maximum power limit until the base station provides enough closed-loop power corrections to cancel out the previous closed-loop power corrections which increased the calculated transmit power level above the maximum power limit. Consequently, a power overshoot occurs, and the extra mobile station transmit power interferes with the transmission between other mobile stations 20 and the base station 10.

The same problem occurs with respect to the lower limit of the mobile station's power level. If the mobile station transmit power is already at its lower limit, and the communications environment changes such that there is less signal interference between the mobile station and the base station, the base station 10 informs the mobile station 20 to further decrease its transmission power. Thereafter, the mobile station 20 determines according to equation (1) a transmit power level lower than the mobile station's minimum possible transmit power level; and therefore transmits at the minimum power level. If the communications environment changes again such that the mobile station 20 should transmit at greater than the minimum power limit, the mobile station 20 will continue to transmit at the minimum power limit until the base station provides enough closed-loop power corrections to cancel out the previous closed-loop power corrections which decreased the calculated transmit power level below the minimum power limit. Consequently, the process of canceling out the previous closed-loop power corrections is time consuming, and thus degrades the reverse link performance.

Accordingly, power overshoot beyond the upper and lower transmission power limits at the mobile station 20 causes excessive interference and degrades overall reverse link performance.

SUMMARY OF THE INVENTION

In accordance with the present invention, a method for controlling reverse-link power control overshoot is achieved by recognizing that the mobile station has transmitter power limitations, and that unnecessary adjustments to the mobile station's transmit power need not be made once the mobile station transmit power has already reached its limit. This is achieved by detecting whether the mobile station transmit power has reached its limit, and adjusting the mobile station mean output power by applying a constant value, to thus eliminate the need to cancel previously accumulated power overshoot corrections.

BRIEF DESCRIPTION OF THE DRAWINGS

The features, aspects, and advantages of the present invention will become better understood with regard to the following description, appended claims, and accompanying drawings where:

DETAILED DESCRIPTION

In an embodiment of the present invention, the mobile station's mean output power algorithm is modified such that the calculations are different when the output power reaches the upper or lower limits of the mobile station transmit power dynamic range.

Figure 1:
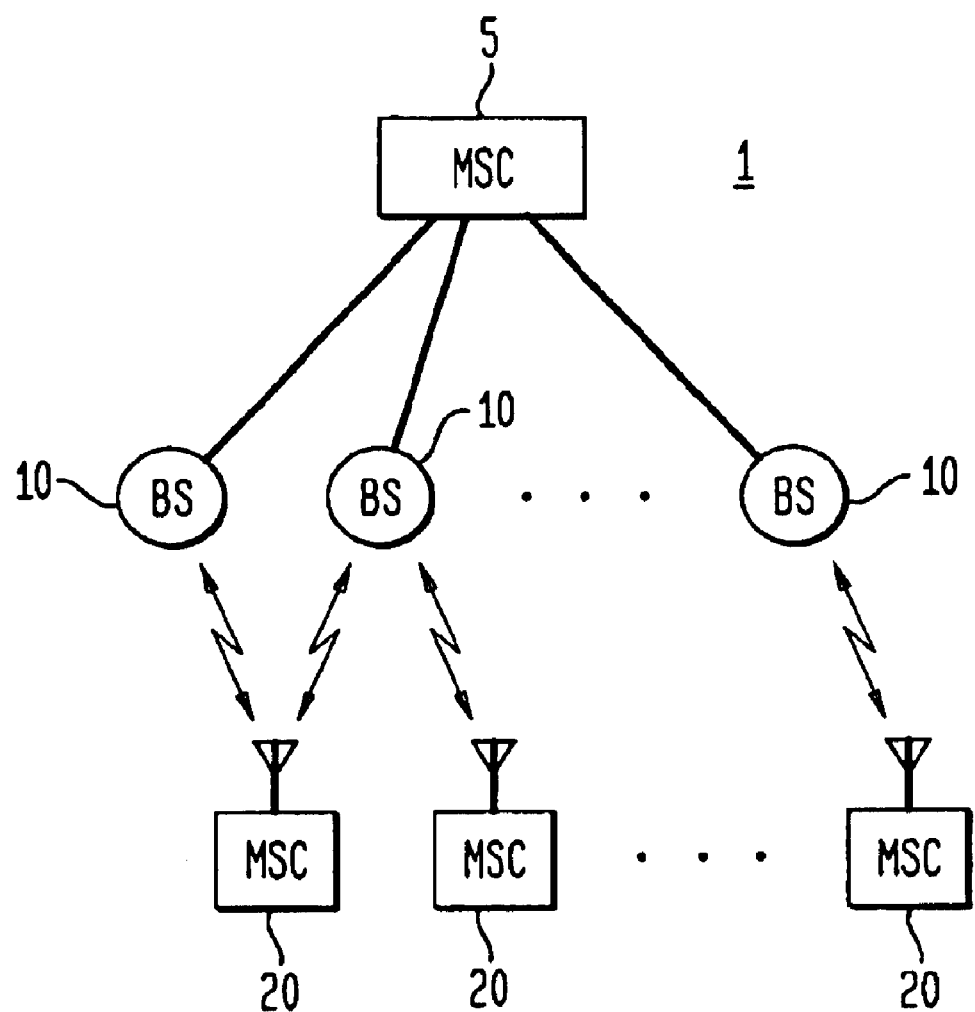
FIG. 1 depicts a schematic diagram of a portion of a conventional wireless communications system.

The present invention will be described with respect to FIGS. 1–3. In particular, FIG. 3 depicts a flowchart explaining a method of minimizing reverse link power control overshoot according to an embodiment of the invention. Steps 100 through 300, which are equivalent to the steps in FIG. 2 will not be explained to avoid repetition. Upon performing step 300, if the mobile station's output power does not require adjustment, the reverse-link power control process proceeds to step 600 to establish a communications link between the mobile station 20 and the base station 10 using well known techniques in the conventional art. If the mobile station's output power requires adjustment, the mobile station 20 makes a further determination of whether its output power is at an upper or lower limit, as shown in step 350.

Figure 2:
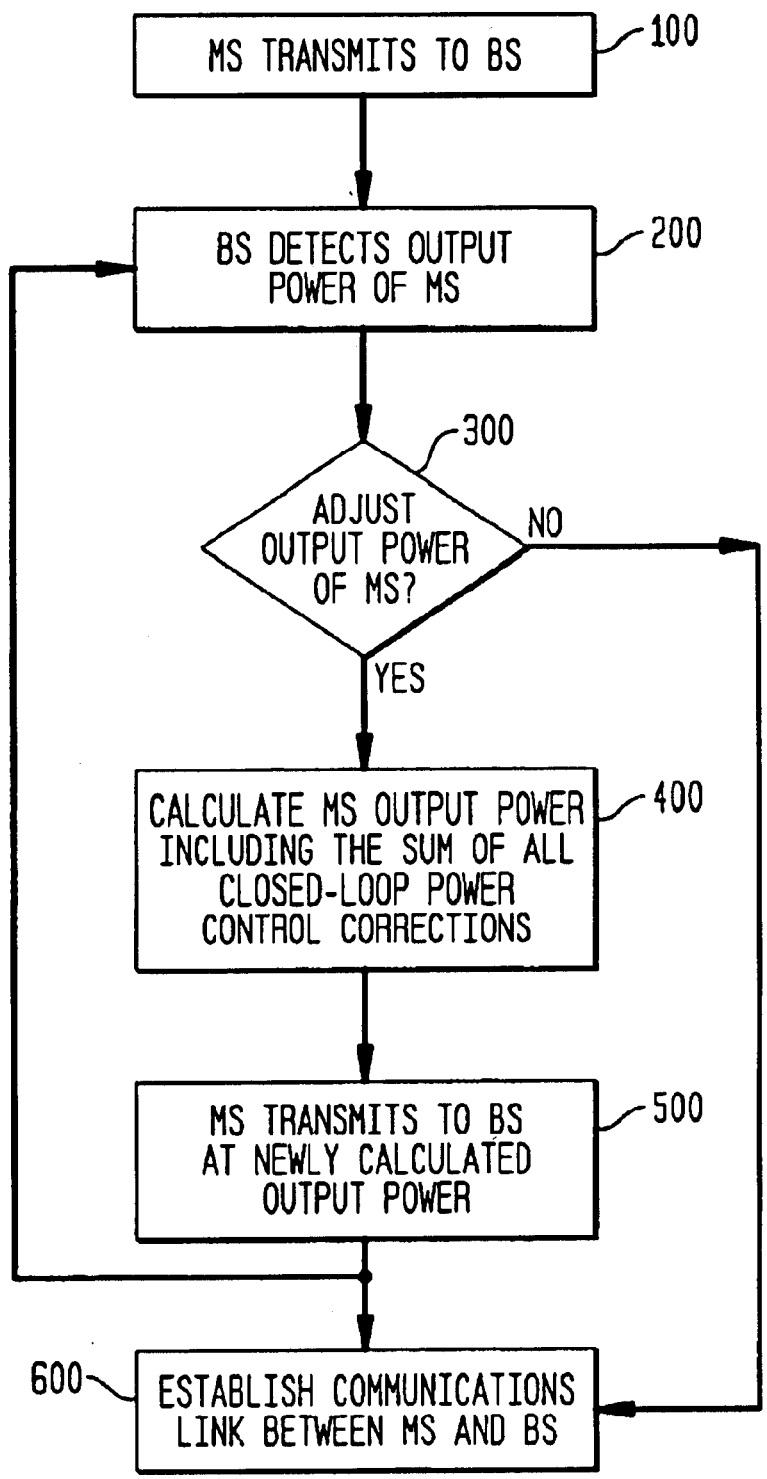
FIG. 2 depicts a flowchart of a conventional reverse-link power control method.
Figure 3:
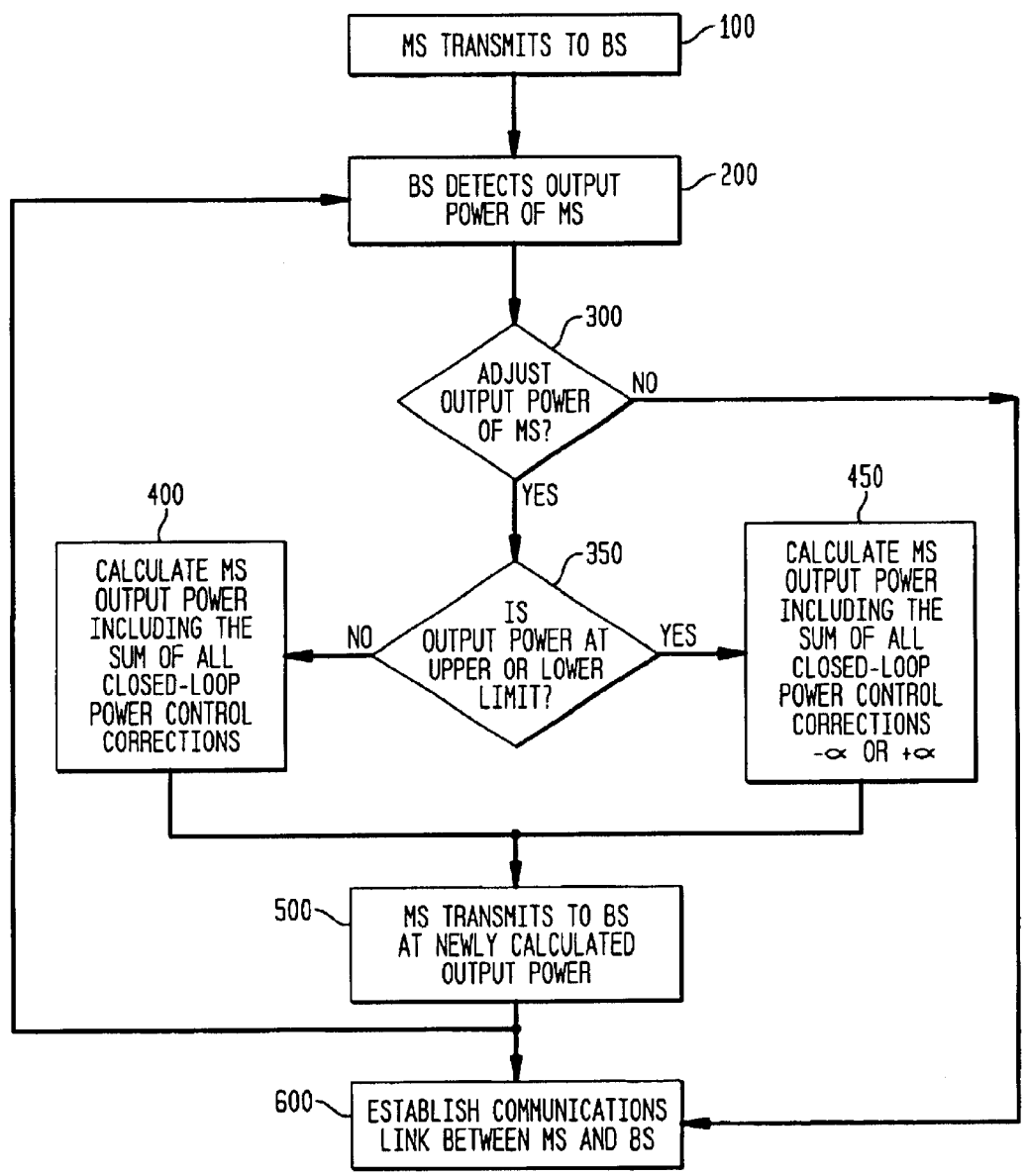
FIG. 3 depicts a flowchart of an illustrative embodiment of the present invention.

If the mobile station's output power is not at the upper or lower limits, the control operation proceeds to step 400, as performed in the conventional reverse-link power control method shown in FIG. 2. In contrast, if the mobile station's output power is at the upper or lower limits, step 450 is performed.

In step 450, the mobile station output power is adjusted by modifying the mean output power algorithm. For the purpose of explanation only, an embodiment of the present invention employing a modified mean output algorithm is applied under the IS-95 CDMA standard (i.e., equation (1)), but the present invention is not limited to any particular standard. The modified mean output power algorithm is as follows:

$$\begin{aligned}\text{Output power} = &-\text{mean input power} + \text{offset} + \\ &\text{interference correction form the last access probe} + \\ &(NOM\_PWR - 16 * NOM\_PWR\_EXT) + INIT\_PWR + \\ &\text{the sum of all access probe corrections} + \\ &\text{closed loop correction.}\end{aligned} \quad (2)$$

where, the closed loop correction,

= the sum of all closed loop power control corrections−$d$; if the mobile station output power is at its upper limit  (3)

or,

= the sum of all closed loop power control corrections+$d$; if the mobile station output power is at its lower limit  (4).

With the exception of the closed loop correction, all other variables are identical to the convention mean output power algorithm described in equation (1) hereinabove. Namely, the closed loop correction is defined as the sum of all closed loop power control corrections with a constant added thereto or subtracted therefrom. More specifically, if the upper limit of the mobile dynamic range is reached by the previous adjustment, and the power control bit from the base station is "1" indicating that output power needs to be increased, the mobile station modifies its mean output power algorithm such that the closed loop correction of the above equation (3) is used. If the lower limit of the mobile dynamic range is reached by the previous adjustment, and the power control bit from the base station is "0" indicating that output power needs to be decreased, the mobile station modifies its mean output power algorithm such that the closed loop correction of the above equation (4) is used.

In the closed loop correction, the constant "d" varies depending upon the standard applicable to the wireless communications system being employed. For example, preferably, d=1 if the IS-95A standard is employed, while preferably, d=0.25 or 0.5 or 1 if the IS-95B standard is employed.

According to the above-described embodiment of the invention, the modified algorithm can eliminate undesired power overshoot, and it is easy to implement. Specifically, it does not require any input from other circuitry such as, the automatic gain control (AGC), and thus significantly simplifies the implementation. This separation of AGC and closed loop power control has little effect on performance because the AGC adjustment is much slower than that of the closed loop power control. Any adjustment made by the AGC during a power control group (PCG) is well within the limit of the mobile dynamic range accuracy requirement. Although the embodiments of the invention pertain to CDMA techniques, application to other techniques, such as TDMA are also deemed feasible.

This specification describes various illustrative embodiments of the method of the invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features which are consistent with the spirit and scope of the invention disclosed herein.

The following is claimed:

1. A method of minimizing reverse link power control overshoot in a communications environment, the method comprising:

receiving a transmission from a mobile station at a first output power level;

determining whether the mobile station should adjust its output power level based on the communications environment;

instructing the mobile station to calculate a second output power level based on an output power level range of the mobile station, if output power level adjustment is required; and instructing the mobile station to transmit at the second output power level, if output power level adjustment is required.

2. The method of claim 1, wherein the second output power level is obtained by instructing the mobile station to increase its output power level by a first amount when the first output power level is below a lower limit of the output power level range.

3. The method of claim 2, wherein the second output power level is obtained by instructing the mobile station to decrease its output power by a second amount when the first output power level is greater than an upper limit of the output power level range.

4. The method of claim 3, wherein the first amount and the second amount are equal.

5. The method of claim 1, wherein the second output power level is obtained by instructing the mobile station to decrease its output power by a first amount when the first output power level is greater than an upper limit of the output power level range.

6. The method of claim 1, further comprising a step of establishing a communications link with the mobile station upon completing output power level adjustment.

7. A method of minimizing reverse link power control overshoot comprising:

detecting whether a current output power of a mobile station falls outside a dynamic range of mobile station output power levels;

instructing the mobile station to adjust its output power towards the dynamic range to obtain an adjusted output power, if the detected output power falls outside the dynamic range; and instructing the mobile station to transmit at the adjusted output power, if the detected output power falls outside the dynamic range.

8. The method of claim 7, wherein the adjusted output power is obtained by instructing the mobile station to increase its output power by a first amount when the detected current output power is below a lower limit of the dynamic range.

9. The method of claim 8, wherein the adjusted output power is obtained by instructing the mobile station to decrease its output power by a second amount when the detected current output power is greater than an upper limit of the dynamic range.

10. The method of claim 9, wherein the first amount and the second amount are equal.

11. The method of claim 7, wherein the adjusted output power is obtained by instructing the mobile station to decrease its output power by a first amount when the detected current output power is greater than an upper limit of the dynamic range.

12. A method of minimizing reverse link power control overshoot in a communications environment, the method comprising:

transmitting at a first output power level;

receiving instructions to adjust the first output power level, if output power level adjustment is required;

calculating a second output power level based upon an output power level range in accordance with the received instructions; and transmitting at the second output power level.

13. The method of claim 12, wherein the second output power level is obtained by increasing the first output power level by a first amount when the first output power level is below a lower limit of the output power level range.

14. The method of claim 13, wherein the second output power level is obtained by decreasing the first output power level by a second amount when the first output power level is greater than an upper limit of the output power level range.

15. The method of claim 14, wherein the first amount and the second amount are equal.

16. The method of claim 12, wherein the second output power level is obtained by decreasing the first output power level by a first amount when the first output power level is greater than an upper limit of the output power level range.

17. The method of claim 12, further comprising a step of establishing a communications link upon completing output power level adjustment.

18. A method of minimizing reverse link power control overshoot comprising:

transmitting at a first output power;

receiving instructions to adjust the first output power towards a dynamic range of mobile station output power levels to obtain a second output power, if the first output power falls outside the dynamic range; and transmitting at the second output power if the first output power falls outside the dynamic range.

19. The method of claim 18, wherein the second output power is obtained by increasing the first output power by a first amount when the first output power is below a lower limit of the dynamic range.

20. The method of claim 19, wherein the second output power is obtained by decreasing the first output power by a second amount when the first output power is greater than an upper limit of the dynamic range.

21. The method of claim 20, wherein the first amount and the second amount are equal.

22. The method of claim 18, wherein the second output power is obtained by decreasing the detected output power by a first amount when the detected output power is greater than an upper limit of the dynamic range.

* * * * *